(12) United States Patent
Nakamura et al.

(10) Patent No.: US 6,717,898 B2
(45) Date of Patent: Apr. 6, 2004

(54) OPTICAL INFORMATION REPRODUCING METHOD FOR REPRODUCING INFORMATION BY GENERATING A SIGNAL REPRESENTING A CENTER OF A MARK

(75) Inventors: Shigeru Nakamura, Tachikawa (JP); Takeshi Maeda, Kokubunji (JP); Koichiro Wakabayashi, Toride (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/436,257

(22) Filed: May 13, 2003

(65) Prior Publication Data

US 2003/0193860 A1 Oct. 16, 2003

Related U.S. Application Data

(63) Continuation of application No. 10/145,041, filed on May 15, 2002, now Pat. No. 6,577,573, which is a continuation of application No. 09/763,866, filed as application No. PCT/JP99/01401 on Mar. 19, 1999, now Pat. No. 6,430,131.

(51) Int. Cl.[7] .................................................. G11B 5/76
(52) U.S. Cl. .................................. 369/59.12; 369/53.31
(58) Field of Search ....................... 369/47.15, 47.35, 369/53.31, 53.44, 59.12, 59.17, 59.21, 124.05

(56) References Cited

U.S. PATENT DOCUMENTS

| | | | |
|---|---|---|---|
| 3,982,195 A | | 9/1976 | Turner |
| 4,475,183 A | * | 10/1984 | Marchant et al. .......... 369/59.1 |
| 6,185,172 B1 | | 2/2001 | Nakazawa |
| 6,430,131 B1 | | 8/2002 | Nakamura et al. |

FOREIGN PATENT DOCUMENTS

| | | |
|---|---|---|
| JP | 7-14170 | 1/1995 |
| JP | 8-96368 | 4/1996 |
| JP | 8-147708 | 6/1996 |

* cited by examiner

*Primary Examiner*—Paul W. Huber
(74) *Attorney, Agent, or Firm*—Antonelli, Terry, Stout & Kraus, LLP

(57) ABSTRACT

An optical information reproducing method for reproducing information recorded at at least one mark on an optical information medium. The method includes irradiating a laser to the optical information medium, detecting a reflected beam reflected from the optical information medium, and reproducing information recorded on the optical information medium from an output signal of a detector which detects the reflected beam. The step of reproducing information is changed in dependence upon a length of the mark of the optical information medium.

4 Claims, 6 Drawing Sheets

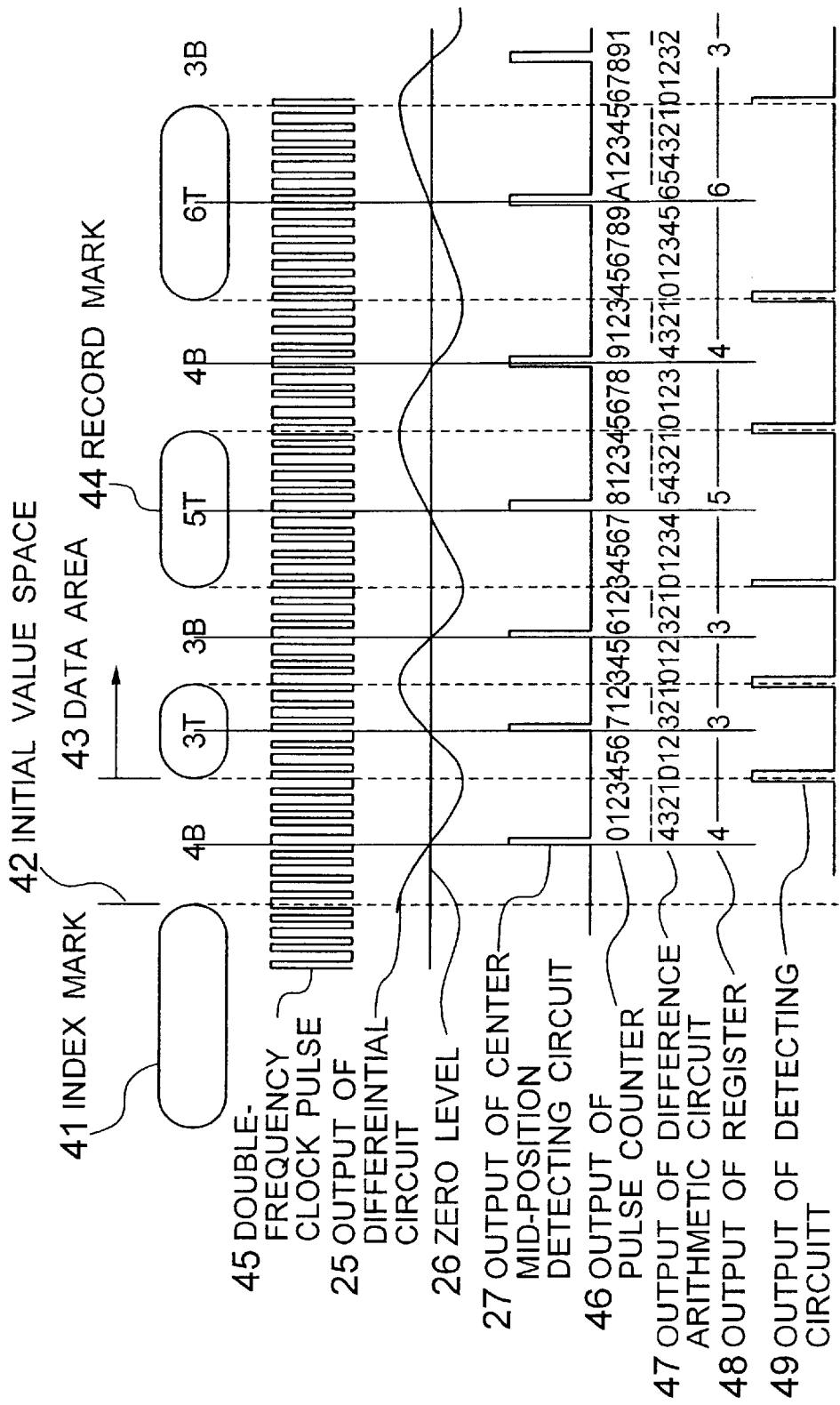

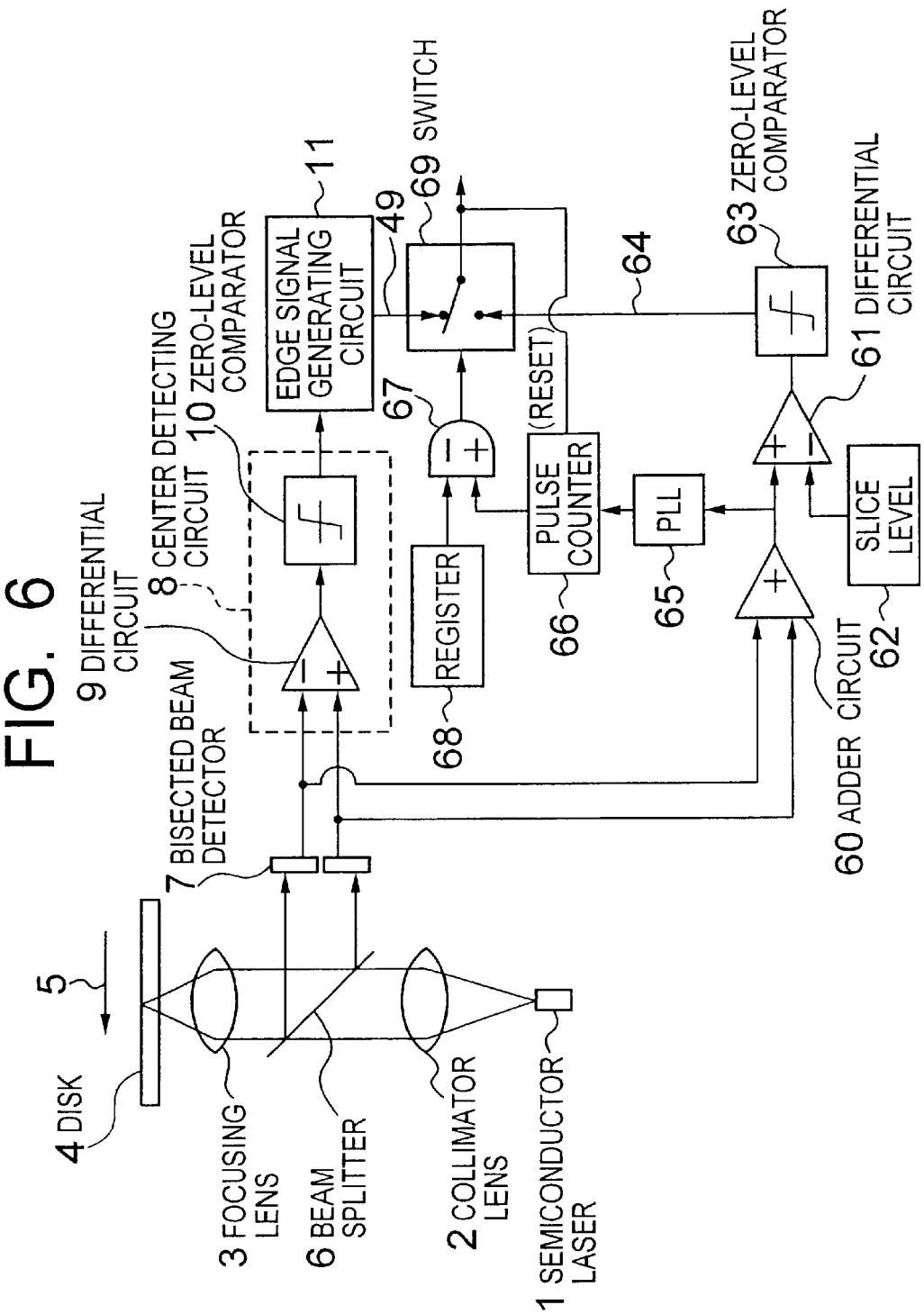

OPTICAL INFORMATION REPRODUCING METHOD FOR REPRODUCING INFORMATION BY GENERATING A SIGNAL REPRESENTING A CENTER OF A MARK

CROSS REFERENCE TO RELATED APPLICATION

This is a continuation of U.S. application Ser. No. 10/145,041, filed May 15, 2002, now U.S. Pat. No. 6,577,573, which is a continuation of U.S. application Ser. No. 09/763,866, filed Jun. 25, 2001, now U.S. Pat. No. 6,430,131, as a national stage application under 35 USC §371 of international application No. PCT/JP99/01401, filed Mar. 19, 1999, the subject matter of which is incorporated by reference herein.

TECHNICAL FIELD

The present invention relates to an optical information reproducing device for reproducing a signal from an optical information medium which carries digital or the like information recorded thereon in correspondence to edge positions of marks in accordance with a mark edge recording scheme.

BACKGROUND ART

According to the mark edge recording scheme, digital information is recorded in the form of marks of different lengths with correspondence being established between bits "1" and "0 (zero)" on one hand and "presence" and "absence" of mark edges, respectively, on the other hand. A typical example of the reproducing method will be described below. When record marks are scanned therealong with a laser beam with a reflection beam being detected and converted into a reproduced signal by means of an optical detector, a reproduced signal is modulated in conformance with the record marks. By way of example, in the case of a CD-ROM disk and a phase-change disk or the like recording medium, when a light spot of the scan beam is positioned on the record mark, the reproduced signal assumes a low level, while it assumes a high level when the light spot is located in a space portion intervening between the record marks. On the other hand, when the light spot lies on an edge of the record mark, the reproduced signal assumes an intermediate level between the low and high levels. By setting a slice level at this intermediate level, an edge signal pulse is generated every time when the reproduced signal traverses the slice level. Thus, with the method described above, information recorded in conformance with the mark edge recording scheme can be reproduced.

DISCLOSURE OF INVENTION

FIG. 5 is a view for illustrating a conventional information reading method which has heretofore been known. The length of a shortest record mark 52 and that of an inter-mark space, are represented by øm, while the length of a light spot 51 in the direction as viewed along the mark row is represented by øs. When the center of the light spot 51 is positioned on an edge 53 of the record mark 52 and when the length øm is shorter than a half of the diameter øs of the light spot, detection error of the edge 53 will be occurred under the influence of an adjacent record mark. Accordingly, the minimum length øm which allows the mark edge to be detected stably corresponds to a half of the diameter øs of the light spot (see FIG. 5(a)).

Further, as is shown in FIG. 5(b), when the recording power is excessively large and/or in case the recording sensitivity of an information recording medium is excessively high upon information recording, the mark which is to be intrinsically recorded in a size indicated by a curve 52 may be recorded in a greater size, as indicated by a curve 54. In that case, the center axis of a read-out or reproduced signal 55 will be deviated downwardly from the slice level 56, as represented by a curve 57 in FIG. 5(c), as a result of which error will be involved in the detection of the mark edge position. When the recording power is excessively low and/or when the recording sensitivity of the information recording medium is excessively low, the center axis of the readout or reproduced signal 55 will equally be deviated upwardly from the slice level 56, which will incur error in the detection of the mark edge position. Additionally, in the case where the reflectivity of the information recording medium changes, the center axis of the read-out signal 55 will be deviated downwardly or upwardly from the slice level 56, as indicated by the curve 57 in FIG. 5(c), which will incur a detection error of the mark edge position as well. For this reason, it is required to control the recording power with very high accuracy in order to suppress the error to a minimum. Besides, tolerance ranges of the recording sensitivity and the reflectivity of the information recording medium has to be necessarily narrow.

An object of the present invention is to provide an optical information reproducing device in which error is difficult to occur in the detection of the mark edge position even when the recording power changes or even in case the recording sensitivity or the reflectivity changes.

For achieving the object mentioned above, the present invention provides an optical information reproducing device which is comprised of a center detecting means for detecting a center of an information mark and a center between an inter-information-mark spaces, and an edge signal generating means for generating an edge signal of the above-mentioned information mark from an output signal of the above-mentioned center detecting means.

BRIEF DESCRIPTION OF THE DRAWINGS

FIG. 4 is a view for illustrating the principle underlying reproduction of an edge signal according to the present invention.

FIG. 6 is a structural diagram showing an optical disk signal reproducing device according to another exemplary embodiment of the present invention.

BEST MODES FOR CARRYING OUT THE INVENTION

Figure 1:
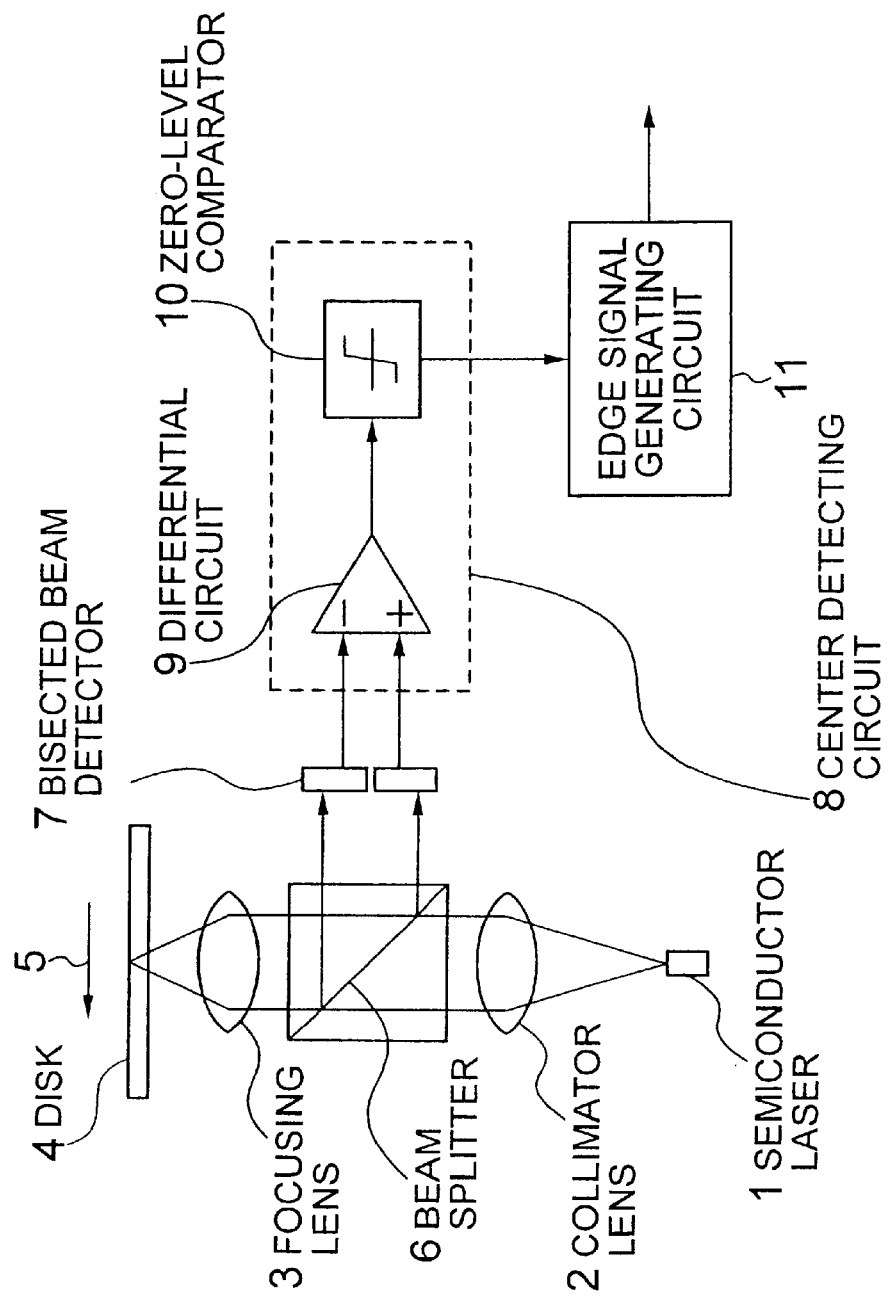
FIG. 1 is a structural diagram showing an optical disk signal reproducing device according to an exemplary embodiment of the present invention.

In the following, description will be made in detail of modes for carrying out the present invention by referring to the accompanying drawings.

In the drawings, reference numerals indicate as follows.

1 . . . semiconductor laser
3 . . . focusing lens
4 . . . optical disk
6 . . . beam splitter
7 . . . bisected beam detector
8 . . . center detecting circuit
9 . . . differential circuit
10 . . . zero-level comparator
11 . . . edge signal generating circuit
33 . . . pulse counter
34 . . . difference arithmetic circuit
35 . . . register
36 . . . zero detector
66 . . . pulse counter
67 . . . difference arithmetic circuit
68 . . . register
69 . . . switch An exemplary embodiment of the present invention will now be elucidated by reference to FIGS. 1 to 4.

FIG. 1 shows a basic structure of a signal reproducing portion of an optical disk device in which the present invention is embodied. A laser beam emitted from a semiconductor laser 1 is converted into a collimated light beam by means of a collimator lens 2, which light beam is then irradiated onto an optical disk 4 in the form of a minute-size light spot through a focusing lens 3. An arrow 5 indicates the moving direction of a rotating optical disk. The laser beam reflected at the optical disk 4 is modulated by information marks recorded on the optical disk 4, whereon the reflected and modulated laser beam is again converted into a collimated light beam by means of a focusing lens 3, whereon the collimated light beam is reflected by a beam splitter 6 to be thereby split into two beams which are then received by a bisected beam detector 7. The bisected beam detector 7 is comprised of two light receiving elements disposed in juxtaposition in the moving direction of the disk indicated by the arrow 5. A center detecting circuit 8 includes a differential circuit 9 and a zero-level comparator 10, wherein the differential circuit 9 determines a difference between the output signals of the two light receiving elements of the bisected beam detector 7, while the zero-level comparator 10 outputs a pulse signal whenever the output signal of the differential circuit 9 assumes the zero level. On the other hand, an edge signal generating circuit 11 measures an interval intervening between the pulse signals outputted from the zero-level comparator 10. On the basis of the inter-pulse-signal interval as measured, the timing at which the light spot 20 is positioned just or exactly on the mark edge of a record mark 21 is arithmetically determined.

Figure 2:
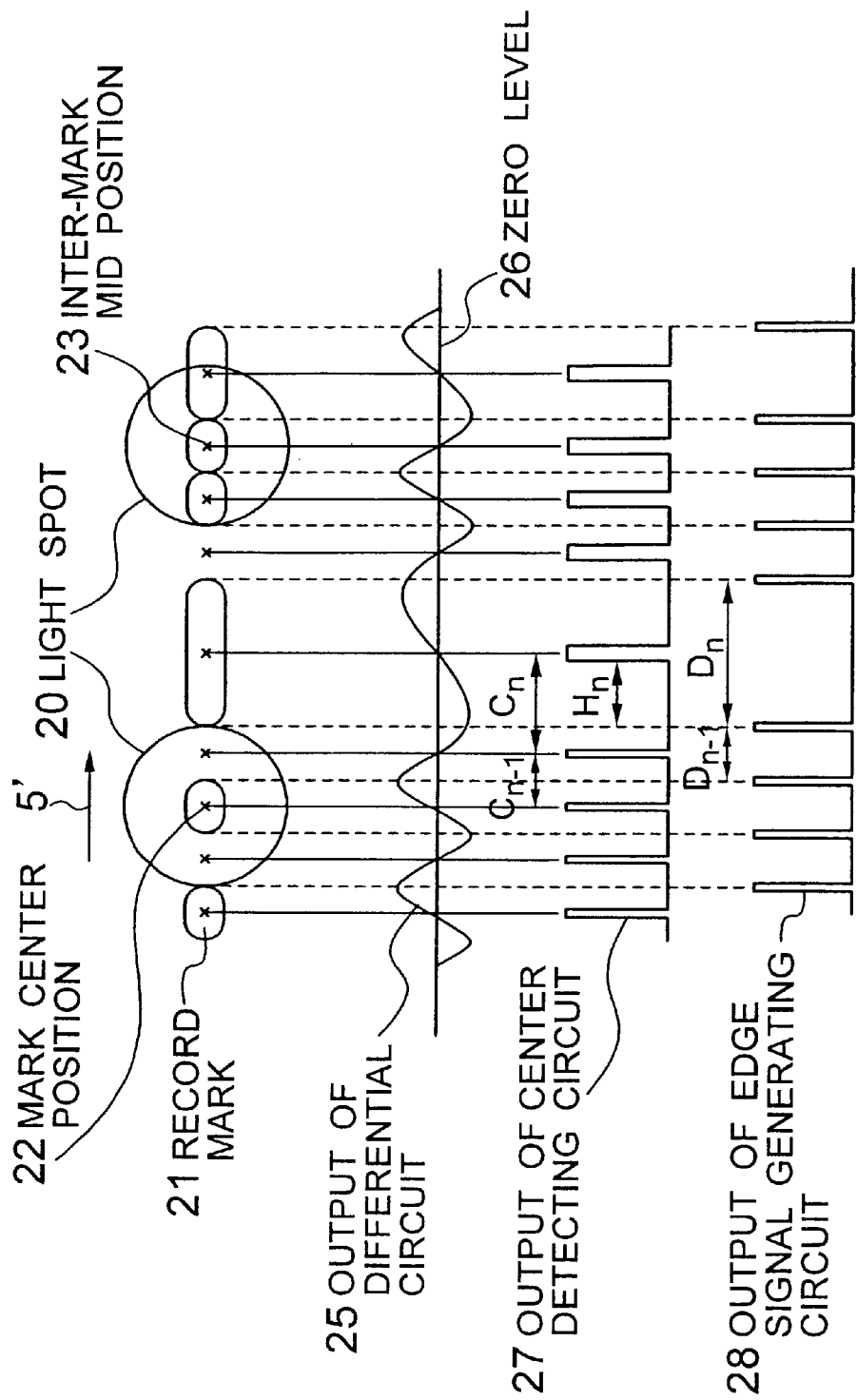
FIG. 2 is a view for illustrating the principle underlying reproduction of an information signal according to the present invention.

FIG. 2 is a view showing a signal 25 outputted from the differential circuit 9, a signal 27 outputted from the center detecting circuit 8 and a signal 28 outputted from the edge signal generating circuit 11 when the record marks 21 formed on the optical disk 4 are scanned by a light spot 20 in the direction indicated by an arrow 5'. The two light receiving elements of the bisected beam detector 7 shown in FIG. 1 are juxtaposed in the scanning direction of the light spot indicated by the arrow 5', wherein left and right beams resulting from bilateral bisection of the reflected beam are received by the two light receiving elements, respectively. When the light spot 20 lies on a center position 22 of the record mark 21, the output signal 25 of the differential circuit 9 assumes the zero level 26 because the intensity distribution of the reflected beam is bilaterally symmetrical as viewed in the direction orthogonally to the plane of the drawing. Similarly, when the light spot 20 is positioned on a mid position 23 between two adjacent record marks 21, the output signal 25 of the differential circuit 9 assumes the zero level 26 because the intensity distribution of the reflected beam is bilaterally symmetrical as viewed in the direction orthogonally to the plane of the drawing. The zero-level comparator 10 outputs the pulse signal whenever the output signal 25 assumes the zero level 26. Thus, when the light spot 20 lies at the center position 22 of the record mark or at the mid position 23 of the space between the two adjacent record marks, i.e., when the light spot 20 is positioned just at the mid position between the adjacent mark edges, the pulse signal makes appearance in the output signal 27 of the center detecting circuit 8. The interval intervening between the pulses making appearance in the output signal 27 of the center detecting circuit 8 is represented by $C_n$ while the preceding inter-mark-edge interval and the succeeding inter-mark-edge interval are represented by $D_{n-1}$ and $D_n$, then $$C_n = D_{n-1}/2 + D_n/2$$

and hence $$D_n = 2C_n - D_{n-1}$$

As is apparent from the above, the succeeding inter-mark-edge interval $D_n$ can be determined by means of the edge signal generating circuit 11 on the basis of the inter-pulse interval $C_n$ of the signal outputted from the zero-level comparator 10 and the preceding inter-mark-edge interval $D_{n-1}$ already determined.

Figure 3:
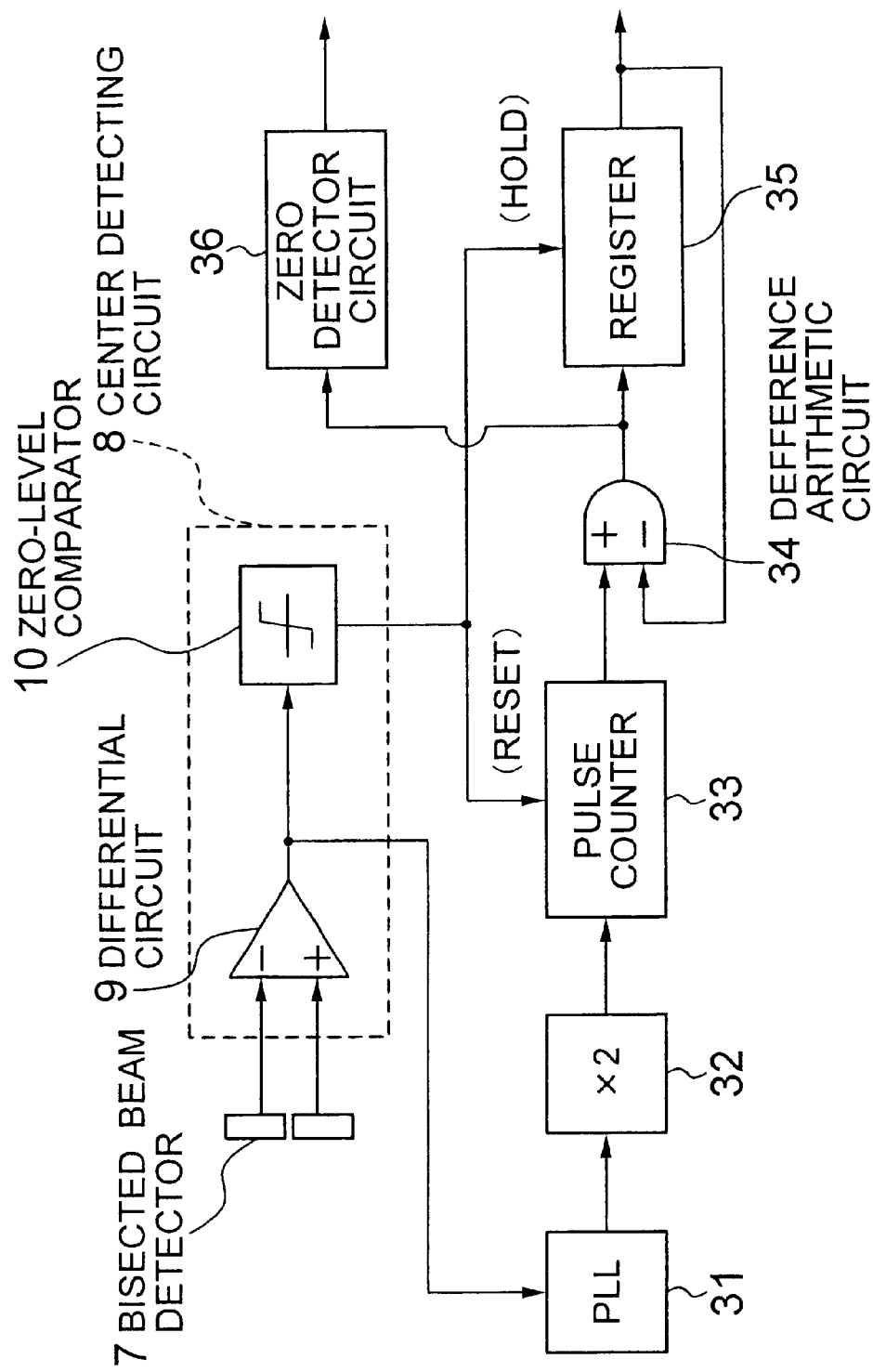
FIG. 3 is a diagram showing a structure of an edge signal reproducing circuit according to an exemplary embodiment of the present invention.

FIG. 3 shows an exemplary embodiment of the edge signal generating circuit 11, and FIG. 4 is a view for illustrating operation of the same. The bisected beam detector 7 and the center detecting circuit 8 which is comprised of the differential circuit 9 and the zero-level comparator 10 serve, respectively, for the same functions as those described hereinbefore by reference to FIG. 1. Reference numeral 31 denotes a phase-locked loop (PLL) circuit for generating a basic clock pulse signal for the reproduced signal on the basis of the output signal 25 of the differential circuit 9. Reference numeral 32 denotes a double-frequency oscillator for generating a clock pulse signal 45 of a double frequency on the basis of the output of the phase-locked loop circuit 31. A reference numeral 33 denotes a pulse counter for counting the number of pulses of the double-frequency clock pulse signal 45. This counter 33 is reset in response to the pulse signal outputted from the center detecting circuit 8. A reference numeral 34 denotes a difference arithmetic circuit, wherein a register 35 holds the output of the difference arithmetic circuit 34 in response to the pulse signal 27 outputted from the center detecting circuit 8. The difference arithmetic circuit 34 determines arithmetically difference between the output value of the pulse counter 33 and the value held by the register 35. Shown, by way of example, in FIG. 4 at a top row thereof are record marks 44 recorded on the optical disk 4. The interval of the basic clock of the reproduced signal is represented by T or B. In the case of the example now under consideration, an index mark 41 indicating a data recording area is disposed in precedence to that data recording area 43. An initial value space 42 of a length 4B exists between the index mark 41 and the data recording area 43. In the data recording area 43, there exist a mark of 3T in length, a space of 3B in interval, a mark of 5T in length, a space of 4B in interval, a mark of 6T in length and a space of 3B in interval. Upon scanning of the index mark 41 with the light spot, the beginning of the data area can discriminatively be determined. When the light spot has reached the center position of the initial value space 42, the center detecting circuit 8 outputs the pulse signal 27. In response to this pulse signal 27, the output value of the pulse counter 33 is reset to zero, whereon the interval value "4" of the initial value space is held by the register 35 as the initial value. At this time, the output value of the difference arithmetic circuit 34 assumes "−4". In FIG. 4, the negative values of the output 47 of the difference arithmetic circuit are designated by affixing bar symbols above the numerical values, respectively. Subsequently, the pulse counter 33 counts the number of pulses of the double-frequency clock pulse signal 45 outputted from the double-frequency oscillator 32. When the light spot reaches the center position of the first mark of 3T in length, the output value of the pulse counter 33 becomes "7" while the value of the output 47 of the difference arithmetic circuit becomes "3". Since the pulse signal 27 is outputted from the center detecting circuit 8 at this time point, the register 35 holds renewedly the value "3" of the output 47 of the difference arithmetic circuit, whereas the output value of the pulse counter 33 is reset to zero. In succession, until the light spot reaches the mid position of the interval space 3B, the pulse counter 33 counts the number of pulses of the double-frequency clock pulse signal 45. When the light spot reaches the center position of the space of the interval 3B, the output value of the pulse counter 33 becomes "6" while the value of the output 47 of the difference arithmetic circuit becomes "3". Since the pulse signal 27 is outputted from the center detecting circuit 8 at this time point, the register 35 holds renewedly the value "3" of the output 47 of the difference arithmetic circuit, while the output value of the pulse counter 33 is reset to zero. Similarly, until the light spot reaches the center position of the succeeding mark of 5T in length, the pulse counter 33 counts the number of pulses of the double-frequency clock pulse signal 45. When the light spot reaches the center position of the mark of 5T in length, the output value of the pulse counter 33 becomes "8" while the value of the output 47 of the difference arithmetic circuit becomes "5". Since the pulse signal 27 is outputted from the center detecting circuit 8 at this time point, the register 35 holds renewedly the value "5" of the output 47 of the difference arithmetic circuit, whereas the output value of the pulse counter 33 is reset to zero. As is apparent from the above, from the output signal 48 of the register 35, the values of the length of the marks recorded in the data recording area 43 and the intervals inclusive of the interval 3B of the initial value space 42, are obtained as "3", "3", "5", "4", "6", "3" and so forth.

Further, referring to FIG. 3, the zero detector circuit 36 is connected to the output of the difference arithmetic circuit 34. The zero detector circuit 36 outputs a pulse signal when the output value of the difference arithmetic circuit 34 becomes zero. Referring to FIG. 4, since the output signal 48 of the difference arithmetic circuit 34 becomes zero when the light spot reaches the edge position of the record mark, the zero detector circuit 36 outputs the pulse signal 49.

Figure 5A:
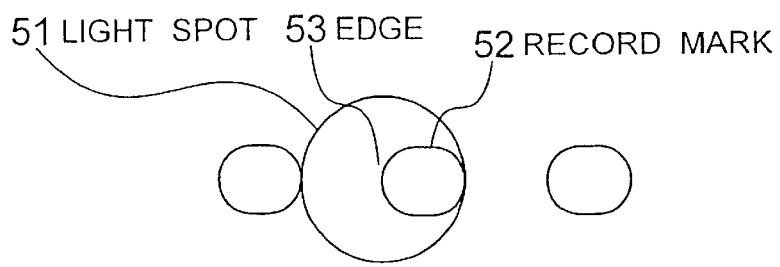
FIGS. 5(a) through 5(c) are views for illustrating read-out signal in a conventional information signal reproducing device.
Figure 5B:
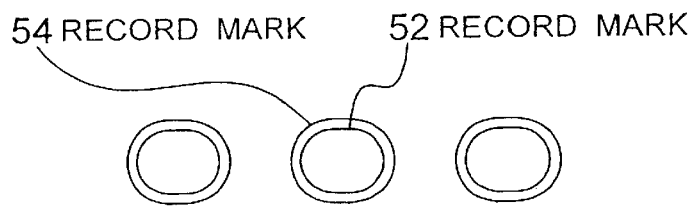
Figure 5C:
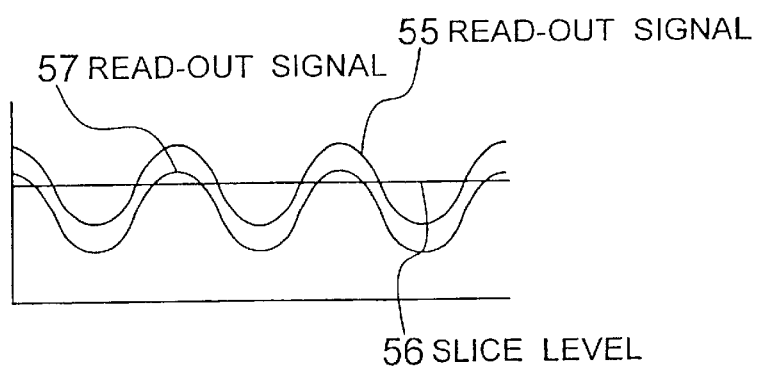

By virtue of the structure described above, there arises no problem of deviation between the readout signal and the slice level described hereinbefore by reference to FIG. 5(c). Besides, the structure described above allows the edge detection even in the case where the length of the light spot in the direction as viewed along the mark row is greater than the double length of the shortest mark. Thus, the information reproducing device according to the present invention can assure such advantage that the short inter-edge intervals between the record marks can be reproduced with higher accuracy when compared with the conventional information reproducing device.

Referring to FIG. 4, it is however noted that the waveform of the output signal 25 of the difference arithmetic circuit becomes flat at the center position of the record mark and the mid position of the inter-mark space portion. Consequently, error may take place in the pulse signal output timing of the zero-level comparator 10 under the influence of noise or the like, as a result of which degradation of the detection performance of the center detecting circuit 8 may be incurred. By contrast, in the case of the hitherto known information reproducing device, error is difficult to occur when the length of the record mark and that of the inter-mark interval are long. For this reason, the present invention proposes a further improved structure by combining the structure of the information reproducing device according to the invention described above and that of the hitherto known information reproducing device.

FIG. 6 shows an optical disk device signal reproducing portion according to another embodiment of the present invention. The components denoted by the same reference numerals as those used in FIG. 1 serve for the same functions as those described hereinbefore by reference to FIG. 1. An adder circuit 60, a differential circuit 61, a slice level circuit 62 and a zero-level comparator 63 are similar to those employed in the information reproducing device known heretofore. More specifically, the adder circuit 60 serves for adding together the two output signals of the bisected beam detector to thereby output a read-out signal designated by reference numeral 57 in FIG. 5(c). On the other hand, the differential circuit 61 serves to determine a difference between the slice level 56 held by the slice level circuit 62 and designated by reference numeral 56 in FIG. 5(c) and the output signal of the adder circuit 60. When the light spot reaches the edge position of the record mark, the output signal of the differential circuit 61 assumes zero level, and the zero-level comparator 63 outputs a pulse signal 64. Reference numeral 65 denotes a phase-locked loop (PLL) circuit which generates the basic clock pulse for the reproduced signal on the basis of the output signal of the adder circuit 60. Reference numeral 66 denotes a pulse counter which serves to count the number of pulses of the basic clock pulse signal outputted from the adder circuit 60. Reference numeral 67 denotes a difference arithmetic circuit. Reference numeral 68 denotes a register. The register 68 is so arranged as to hold an inter-edge interval determination reference value for selecting either the output signal 49 of the information reproducing device according to the present invention or the output signal 64 of the conventional information reproducing device. By way of example, when the inter-edge interval between the record marks is shorter than 6T, the output signal 49 of the information reproducing device according to the present invention is selected, whereas when the inter-edge interval of the record marks is longer than 6T, the output signal 64 of the conventional information reproducing device is selected with the value "6" being held by the register 68. The arithmetic circuit 67 determines difference between the output value of the pulse counter 66 and the value held by the register 35. Reference numeral 69 denotes a switch which is so arranged as to select the output signal 49 of the information reproducing device according to the present invention when the output value of the arithmetic circuit 67 is of negative polarity, while the output signal 64 of the conventional information reproducing device is selected when the output value of the difference arithmetic circuit 67 is greater than zero inclusive thereof.

The pulse counter 66 is reset in response to the pulse signal outputted from the switch 69. At first, the switch 69 selects the pulse signal 49 of the information reproducing device according to the present invention and the pulse counter 66 is then being reset. When the scanning of the recorded data area with the light spot is started, the pulse counter 66 counts the number of pulses of the-basic clock pulse signal outputted from the adder circuit 60. By way of example, in the case where the succeeding inter-record-mark-edge interval is shorter than 6T, the output value of the pulse counter 66 is smaller than the value "6" held by the register 68 with the output value of the arithmetic circuit 67 remaining negative, whereby the output signal 49 of the information reproducing device according to the present invention is selected by the switch 69. Thus, the mark edge signal 49 fed by way of the center detecting circuit 8 is outputted via the switch 69. Subsequently, the pulse counter 66 is reset in response to the pulse signal outputted from the switch 69. On the other hand, in the case where the succeeding inter-record-mark-edge interval is equal to or longer than 6T, the output value of the pulse counter 66 assumes the value "6" which is held by the register 68 with the output value of the arithmetic circuit 67 assuming zero, whereby the output signal 64 of the conventional information reproducing device known heretofore is selected by the switch 69. Subsequently, the pulse counter 66 is reset in response to the pulse signal outputted from the switch 69, which results in that the output value of the arithmetic circuit 67 becomes negative, as a result of which the state where the output signal 49 is selected by the switch 69 is restored.

In the foregoing description of the exemplary embodiments of the invention, it is presumed that the bisected beam detector 7 is employed as the bisected beam detecting means for detecting the reflected beam by dividing it into two beams. However, the present invention is never restricted to such arrangement. As the alternative means or measures, such arrangement may also be adopted that by using a diffraction grating having two diffraction areas differing each other in respect to the direction of diffraction and a hologram element, the reflected beam is bisected at a boundary line extending perpendicularly to the scanning direction of the light spot, wherein the bisected reflected beams are received by a pair of photodetectors. Furthermore, although the foregoing description of the exemplary embodiments of the present invention has been made on the presumption that in carrying out the invention, such optical disk as CD-ROM disk, phase change disk or the like in which the quantity of light of the reflected beam is modulated by record marks is employed, it goes without saying that the present invention can equally be applied to the reproduction of information form such information reproducing device as an optomagnetic disk in which the direction of polarization of the reflected beam is modulated by the record mark domains.

As is apparent from the foregoing, according to the teachings of the present invention, it is possible to reproduce information from an information medium of higher density than the hitherto known information medium by using a light spot of a large size. It should further be added that there can be implemented the optical information reproducing device in which error is made to be difficult to occur in the detection of the mark edge position notwithstanding of change or variation of the recording power, change of the recording sensitivity of the information medium and variation of the reflectivity.

What is claimed is:

1. An optical information reproducing method for reproducing information recorded on an optical information medium, comprising:
   irradiating a laser beam onto the optical information medium;
   detecting a reflected beam reflected from the optical information medium;
   generating a first signal representing a certain position of a mark;
   generating an edge signal for the mark by using the first signal; and
   reproducing information recorded on the optical information medium,
   wherein the certain position of the mark is a center of the mark.

2. An optical information reproducing method according to claim 1, wherein the edge signal is generated by arithmetical determination.

3. An optical information reproducing method for reproducing information recorded on an optical information medium, comprising:
   irradiating a laser beam onto the optical information medium;
   detecting a reflected beam reflected from the optical information medium;
   reproducing information recorded on the optical information medium from the reflected beam, based on:
      generating a signal representing a center of a record mark;
      generating an edge signal for the record mark by using the signal representing the center of the record mark.

4. An optical information reproducing method according to claim 3, wherein the edge signal is generated by arithmetical determination.

* * * * *